June 25, 1929.  J. F. WALLACE  1,718,323
AIR SPRING
Filed Dec. 27, 1921
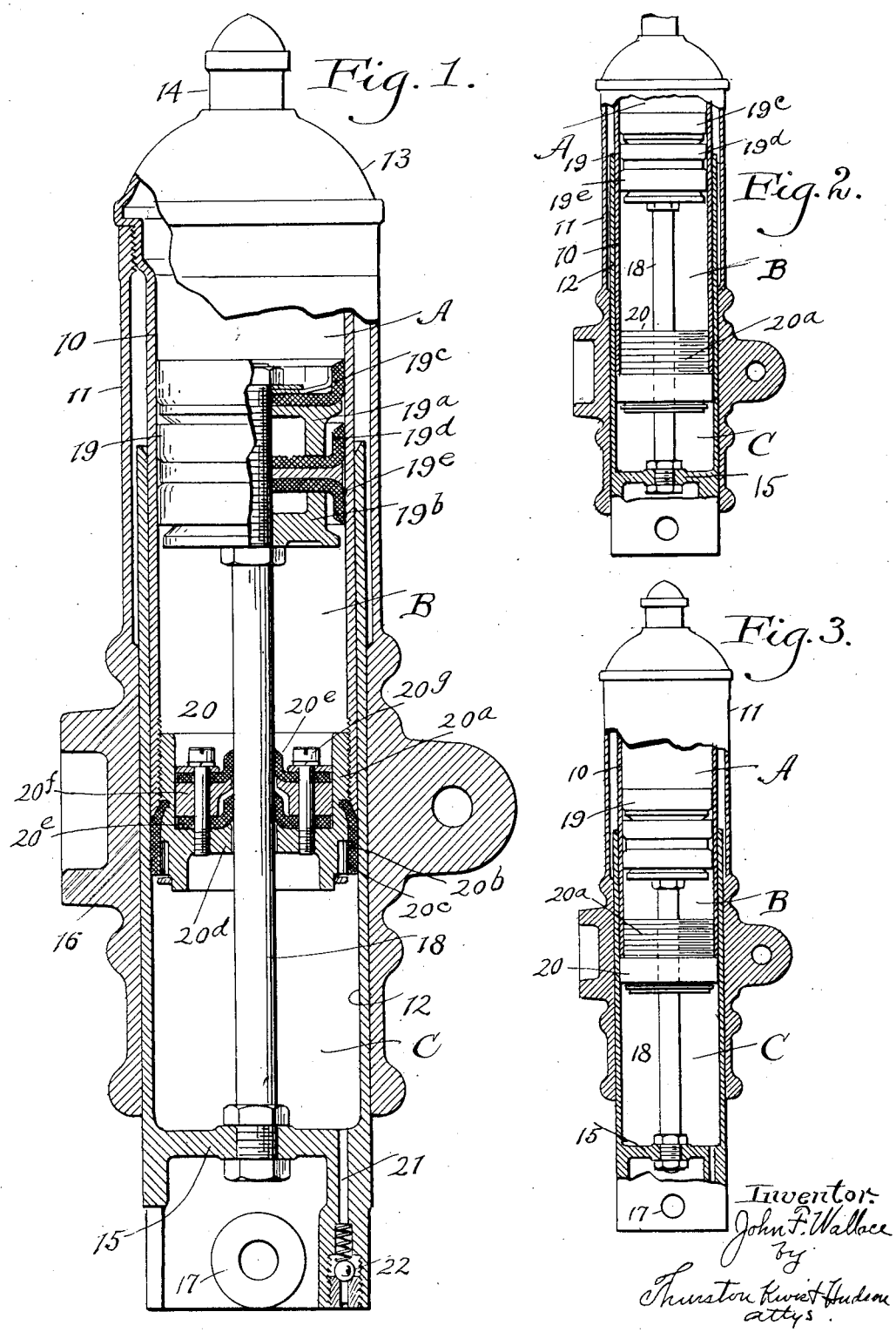
Inventor:
John F. Wallace
by
Thurston Kwis & Hudson
attys.

Patented June 25, 1929.

1,718,323

UNITED STATES PATENT OFFICE.

JOHN F. WALLACE, OF CLEVELAND, OHIO, ASSIGNOR TO THE CLEVELAND PNEUMATIC TOOL COMPANY, OF CLEVELAND, OHIO, A CORPORATION OF OHIO.

AIR SPRING.

Application filed December 27, 1921. Serial No. 524,864.

This invention relates to air springs of the type employed on motor vehicles, generally in connection with the main leaf springs thereof.

The principal object of the present invention is to provide an air spring which acts as a shock absorbing element and is effective for checking rebound.

Still further the invention aims to provide an efficient telescopic air spring which does away with the necessity of providing in the spring, oil or any considerable quantity of oil or grease for sealing purposes.

In other words, it is one of the principal objects to provide an efficient air spring of the telescopic sleeve type wherein the load is normally supported by air, and wherein the compression and extension movements are ejected by air.

The invention may be briefly summarized as consisting in certain novel details of construction, and combinations and arrangements of parts which will be described in the specification and pointed out in the appended claims.

In the accompanying sheet of drawings wherein I have shown the preferred embodiment of the invention, Fig. 1 is a view partly in elevation and partly in section, of a spring embodying my invention, the telescopic parts of the spring including the piston being shown in substantially the positions they occupy normally when the spring is attached to a vehicle; and Figs. 2 and 3 are similar views on a reduced scale, compressed or telescoped inward and extended respectively.

Referring to the drawing, it will be observed that the air spring includes three telescoping sleeves, including an inner upper sleeve 10, an outer upper sleeve 11 concentric therewith, constituting the housing member, and a lower sleeve 12, telescopically arranged with respect to the first named sleeves and adapted to slide between them.

The upper sleeve has an end closure or head 13 to which compressed air may be supplied through a suitable valve means designated as a whole by the reference character 14. The lower sleeve 12 has a head 15. The outer sleeve or housing 11 is provided with a portion 16 adapted to be secured in any suitable manner to the chassis of a vehicle, and the lower head 15 has a portion here designated 17, adapted to be secured in any desired manner to the end of the leaf spring.

It will be observed that the two inner sleeves form an extensible and collapsible devise adapted to yield first in one direction and then the other when the vehicle equipped with four such springs is traveling over a more or less rough road.

The lower head 15 has secured to it an upstanding piston rod 18 which extends up centrally of the device, and to the top of this piston rod is connected a piston 19 which slidingly engages the inner wall of the inner upper sleeve 10, this piston at all times moving with the piston rod and lower head 15. Preferably the piston is composed of sections, and carries suitable packing elements, and in this instance the piston is composed of two main sections $19^a$ and $19^b$, and carries two upturned packing elements formed of leather or equivalent means and designated $19^c$ and $19^d$, and a similar lower downturned packing element $19^e$.

At the bottom of the upper inner sleeve 10 there is provided a piston head 20, through which the piston rod slides. This piston head comprises an annular body $20^a$, screwed into the lower part of the sleeve 10, and projecting below it. The lower part of this body carries packing $20^b$ which may be formed of leather or equivalent material, and is yieldingly pressed outward by a spring $20^c$ or equivalent means to prevent leakage between the two sleeves. The piston head body $20^a$ has near the bottom an inwardly extending flange $20^d$ having a central opening for the piston rod 18, and in the recess or cup formed by this flange and the cylindrical wall of the piston head body there is provided one or more upturned packing elements, preferably two packing elements $20^e$, which in this instance are separated by the intermediate member $20^f$ secured with the packing elements by screws $20^g$ or equivalent means to the bottom flange $20^d$. The packing elements $20^e$ slidingly engage the piston rod 18.

This construction provides in effect three air chambers, A above the piston 19, B between the piston 19 and piston head 20, and C between the piston head 20 and lower head 15.

The upper chamber A forms the main compression chamber, and in this chamber compressed air is supplied at a pressure sufficient to support the load. Preferably the upper part of the piston is covered with grease, or a small quantity of oil to make a substantially leak proof joint between the piston 19 and the sleeve which it engages. Likewise, a small quantity of grease may be placed above the head 20 to minimize leakage between the chambers B and C, but no oil or grease is placed in chamber C and no oil or grease need be provided in either of the chambers A or B. The engaging surfaces between the sleeves 10, 11 and 12 may be lubricated by supplying grease into the space between the sleeves 10 and 11 in the customary manner.

Air is adapted to be supplied to the lower chamber through a duct 21 extending through the head 15, which duct contains a check valve 22 adapted to open upwardly so as to admit air under certain conditions to the lower chamber C, but to prevent its escape through this duct.

This air spring operates in the following manner: Assuming that the spring is assembled, and a set has been placed on the car, before air at the right pressure is placed in chamber A, the spring is fully collapsed or shortened. Then the compressed air is admitted to chamber A through the valve means at the top of the spring, and the piston 19 and with it the lower head and lower sleeve are gradually forced downward until there is sufficient air pressure in the chamber A to support the load, at which time the piston stands at about the position shown in Fig. 1. When this is done, the capacity of the chamber B is decreased, and the capacity of the chamber C is increased slightly increasing the air pressure in chamber B, and air enters through the port 21 in response to the increased volumetric capacity of chamber C, maintaining substantially atmospheric pressure therein.

When the vehicle equipped with these springs is put into use, the oscillation of the piston 19 and head 15 relative to the piston head 20, produces a pumping action which builds up pressure in the chamber B, in the following manner and to the extent stated below.

When the piston 19 goes up as when the wheels strike an obstruction, the capacity of chamber C is suddenly decreased and that in chamber B is increased, causing air to be forced up between the packing elements 20ᵉ and the piston rod into chamber B. When the reverse motion takes place, the air thus pumped in chamber B is trapped therein, due to the fact that the cup leathers or packing elements 20ᵉ are turned upwardly, and at the same time, more air is admitted by way of duct 21 into chamber C. This pumping action continues, gradually increasing the air pressure in chamber B, until the pressure in chamber B equals that in chamber C when the former is at its maximum size and the latter at its minimum size. That is to say, the pumping action will take place, building up the pressure in chamber B until there has been such a transference of air that when the piston 19 is at its extreme height in the inner upper sleeve, the pressure in chamber B is then equal or substantially equal to the pressure in chamber C, it being understood that when the pressure in chamber C is substantially at atmospheric pressure, with the chamber C expanded to its maximum size or capacity, no further air will be drawn into the chamber C, past the valve 22 through the duct 21. After this condition is created, it will be noted that when the piston is at its normal position, the pressure in chamber A is the same as that originally supplied thereto, but now there exists in chamber B beneath the piston 19, a pressure which is somewhat above atmospheric but less than the pressure in chamber A, and in chamber C the pressure is somewhat above atmospheric (since the size of the chamber was reduced following the building up to or substantially to atmospheric pressure when the chamber C is at its maximum size) but with the spring in normal position the pressure in chamber C is below that in chamber B. This air pressure condition in chambers B and C, brought about by the pumping action explained above, is created after a few oscillations of the spring, and almost immediately after the spring is put into use with the vehicle traveling over rough roads.

It will be seen, therefore, that after the upper chamber A is charged with air at the usual pressure to support the load, and after the air pressure in chambers B and C has been created as explained, the air pressure in the main compression chamber A yieldingly resists the compression or collapsing stroke of the spring, supplemented to some extent, but to a relatively small measure by the air in chamber C. At the same time, however, there is air pressure on opposite sides of the piston 19, so that the pressure in chamber B yieldingly resists, and therefore checks the rebound or extension stroke of the spring.

This produces an effective spring, and one requiring no oil in any considerable quantity, if oil is used at all, so there is absent substantially entirely the oil leakage which has been a detriment to, and in certain instances an objection to certain types of air springs.

The construction of the piston 19 is such that there is very little leakage from chamber A, and, of course, if leakage does occur, the pressure can be restored by supplying more air to chamber A in the usual manner.

Furthermore, while it was above stated that the pumping action which built up pressure in chamber B would cease when a certain equilibrium of pressures was established, and that the passage of air in the chamber C would likewise cease when a certain pressure condition was established in chamber C, the pumping action, i. e., the transference of air from chamber C to chamber B, and the passage of air into chamber C by way of the valve 22 and duct 21 will take place automatically to replace air which may leak from chambers B and C.

A spring constructed as above described, and having the function or action above explained, is believed to be entirely new with me, and while I have shown simply one construction, I do not desire to be confined to the exact details shown, but aim in my claims to cover all modifications which do not involve a departure from the spirit and scope of my invention as set forth in the appended claims.

Having described my invention, I claim:

1. In an air spring, a pair of telescopic sleeves having end closures or heads, a piston slidable in one of the sleeves and connected to the head of the opposite sleeve, the sleeve which the piston engages having a second head which with said piston divides the interior space into three air chambers, one of the end chambers having a check valve controlled air inlet, and means whereby during the operation of the spring air is forced from said end chamber into the intermediate chamber and trapped therein, the other end chamber being adapted to be supplied with air under pressure for load supporting purposes, said piston and head being constructed to prevent leakage between the load sustaining chamber and the intermediate chamber and from the intermediate chamber into the chamber having the air inlet.

2. In an air spring for vehicles, a cylinder closed at its top and adapted to be connected to one element of the vehicle, a piston working in the cylinder and carried by a rod adapted to be connected with another element of the vehicle, spaced packing members on the piston, the upper one having an up-turned marginal flange and the lower one having a down-turned marginal flange, and a packing member on the lower end of the cylinder having an up-turned marginal flange in sliding contact with the rod, and forming with the lower packing member on the piston an enclosed space to serve as a recoil check.

3. An air spring comprising relatively slidable members including a sleeve having upper and lower heads and a relatively movable piston in the sleeve chamber forming on opposite sides of the piston main and auxiliary air chambers, said piston having packing adapted to prevent leakage of air from either chamber into the other, the main air chamber being adapted to be supplied with air under pressure for load supporting purposes, and means for automatically pumping air into the auxiliary chamber and for preventing escape of air from said auxiliary chamber to maintain air pressure in excess of atmospheric therein.

4. In an air spring, a pair of telescopic sleeves having end heads, a piston slidable in one of said sleeves, said piston having means including packing which prevents leakage of air in either direction, a rod connecting the piston to the head of the other sleeve, one of said sleeves having a head provided with packing through which the rod slides, said heads and piston dividing the interior space into three chambers, and said head packing permitting air to flow from one of the end chambers to the intermediate chamber, but preventing reverse flow.

5. In an air spring, a pair of telescopic sleeves having end heads, a piston and a rod connected to the head of one sleeve, the piston engaging the inner surface of the other sleeve, said piston having means for preventing leakage of air past the piston in either direction, and said last mentioned sleeve having a head through which the rod passes, said piston and head dividing the interior space of the two sleeves into three air chambers, and said last mentioned head having means for permitting air to flow from an end chamber to the intermediate chamber, but preventing reverse flow.

6. In an air spring, a pair of telescopic sleeves having end heads, a piston and a rod connected to the head of one sleeve, the piston engaging the inner surface of the other sleeve, said piston having means including packing which prevents the leakage of air past the piston in either direction, and said last mentioned sleeve having a head through which the rod passes, said piston and said last named head dividing the interior space of the two sleeves into three air chambers, said last mentioned head having means permitting air to pass from an end chamber to the intermediate chamber.

7. An air spring comprising telescopic sleeves having end heads at opposite ends of the device, the inner sleeve having a transverse head between the first mentioned heads, and the outer sleeve having a piston between the two heads of the inner sleeve, said piston having means including packing which prevents leakage of air past the piston in either direction, said piston being connected to the head of the other sleeve, whereby three separate chambers are formed, said transverse head having packing permitting air to pass from an end chamber to the intermediate chamber, but preventing reverse flow.

8. An air spring comprising telescopic sleeves closed at their remote ends, one of said sleeves having a head spaced from its closed end, a piston working in the latter sleeve whereby three separate chambers are formed, a rod connecting said piston with a closed end of the other sleeve, said piston comprising means including packing for preventing leakage of air past the piston in either direction, the chamber between said piston and the proximate end wall of the air spring being adapted to be supplied with compressed air for load supporting purposes, and means for automatically pumping air into the other end chamber and out of the same into the intermediate chamber and retaining it therein, whereby a pressure is maintained in the intermediate chamber normally in excess of that in the last mentioned end chamber.

9. In an air spring, a pair of telescopic sleeves having end heads, a piston slidingly engaging one of the sleeves and having a rod connecting it to the head of the opposite sleeve, said piston having means for preventing leakage of air in either direction past the piston, said sleeve which the piston engages having a second head with packing through which the rod slides, said last-named head and piston dividing the interior space into three chambers, said head packing permitting air to pass into the intermediate chamber from one of the end chambers and preventing its flow in the opposite direction, the opposite end chamber being adapted to be supplied with air under pressure.

10. In an air spring, a pair of telescopic sleeves having end heads, a piston slidingly engaging one of the sleeves and having a rod connecting it to the head of the opposite sleeve, said piston having means including packing adapted to prevent the leakage of air in either direction past the piston, said sleeve which the piston engages having a transverse head with packing through which the rod slides, said transverse head and piston dividing the interior space into three chambers, said head packing permitting air to pass into the intermediate chamber from one of the end chambers and preventing its flow in the opposite direction, and means whereby air may be supplied to said end chamber by the telescopic action of the spring, the opposite end chamber being adapted to be supplied with air under pressure.

11. In an air spring for vehicles, a cylinder closed at one end and adapted to be connected to one of two relatively movable elements of a vehicle, a piston working in the cylinder, a rod attached to said piston and adapted to be connected to the other relatively movable element of the vehicle, said piston comprising means adapted to prevent the leakage of air past the piston in either direction, the end of said cylinder opposite its closed end having a packing adapted to permit the flow of air into the chamber between said last mentioned packing and said piston and to prevent its flow in the opposite direction.

In testimony whereof, I hereunto affix my signature.

JOHN F. WALLACE.